United States Patent [19]
Martinez et al.

[11] Patent Number: 5,459,202
[45] Date of Patent: Oct. 17, 1995

[54] ELASTOMER SEAL

[75] Inventors: Felix V. Martinez, Kennett Square, Pa.; Nabil F. Boufakhreddine, Twinsburg, Ohio

[73] Assignee: E. I. Du Pont de Nemours and Company, Wilmington, Del.

[21] Appl. No.: 268,584

[22] Filed: Jun. 30, 1994

[51] Int. Cl.$^6$ .......... C08L 27/16; C08L 27/18; C08L 27/20; C08L 27/04; C08L 27/22

[52] U.S. Cl. .......... 525/200; 525/199; 525/194; 525/193; 524/520

[58] Field of Search .......... 525/200, 199

[56] References Cited

U.S. PATENT DOCUMENTS

| | | | |
|---|---|---|---|
| 3,519,703 | 7/1970 | Merkl et al. | 525/199 |
| 3,723,577 | 3/1973 | Stivers | 525/199 |
| 3,879,044 | 4/1975 | Estes | 277/227 |
| 4,529,784 | 7/1985 | Finlay | 526/247 |
| 4,612,351 | 9/1986 | Caporiccio | 525/199 |
| 4,948,830 | 8/1990 | Martin et al. | 524/462 |
| 5,051,479 | 9/1991 | Logothetis et al. | 525/197 |

FOREIGN PATENT DOCUMENTS

| | | | |
|---|---|---|---|
| 3100039 | 4/1991 | Japan | 525/200 |

OTHER PUBLICATIONS

3–M Company, KEL–F Elastomer 3700, Technical Information (Compounding, Valcanization, Fabrication); Date Unknown, pp. 1–6.

*Primary Examiner*—Carman J. Seccuro, Jr.
*Attorney, Agent, or Firm*—Edwin Tocker

[57] ABSTRACT

Seals capable of containing corrosive liquid and/or vapor of, e.g., HCFCs, are made of cured blends of (a) CTFE/VF$_2$ elastomer, (b) chlorine-free fluoroelastomer, and (c) 1 to 20 wt % of hydrocarbon polymer, based on the combined weight of (a) and (b). The blends are homogeneous and coherent wherein the hydrocarbon polymer is not visible at 165× magnification as a separate phase within the matrix of the blend of (a) and (b) and the blend is free of internal cracks and voids.

19 Claims, No Drawings

ELASTOMER SEAL

BACKGROUND OF THE INVENTION

The present invention relates to fluoroelastomer seals and compositions therefore, for sealing such fluids as fluorocarbons, chlorocarbons, hydrogen fluoride and hydrogen chloride, and mixtures thereof.

An important use of elastomers is for the production of seals, such as gaskets and O-rings for sealing fluids. Elastomers generally are able to act as a seal because of their resilience and general irapermeability to many fluids. This is important not only to avoid the loss or contamination of valuable materials, but also to protect personal safety, health and the environment.

The requirements for a suitable seal are many. First, of course, it must not degrade or lose its elasticity in contact with the fluids being handled, even at extremes of temperature and pressure. It must not allow these fluids to pass through them easily by permeation. It must not react with these fluids or contaminate them with impurities. And the material must not swell appreciably in contact with the fluids being handled, even at elevated temperatures. For example, if an O-ring in contact with a moving surface swells appreciably, it may be extruded into a close-clearance area where it will be torn by friction. When an O-ring swells while in contact with a fluid under pressure or high temperature, and the pressure or temperature is then reduced, the O-ring may shrink from its extruded position in a way that causes fluid leakage to occur.

Fluoroelastomeric polymers have been utilized extensively for such sealing applications because of their outstanding chemical inertness, solvent resistance and their resistance to high temperatures. In such applications their higher cost than other elastomers is readily justified by their longer life and superior performance.

However, existing fluoroelastomers are not by themselves suitable for sealing certain organic fluorochemical fluids under typical conditions. Because of the chemical similarity of fluorochemical fluids to fluoroelastomers, the fluids tend to dissolve in the fluoroelastomers and thereby cause its swelling and physical deterioration. When such fluorochemicals are manufactured, many of the process streams also contain chlorocarbons and highly corrosive hydrofluoric acid (HF) or hydrochloric acid (HCl), adding to the severity of attack. In particular, 2,2-dichloro-1,1,1-trifluoroethane (HCFC-123) is very aggressive in surface attack on seals. HCFC-123 has therefore proven to be one of the most difficult products for which to find a satisfactory seal.

There is a need in the fluorochemical industry for a fluorine-containing elastomeric seal especially suitable for sealing, including containing fluorocarbons, chlorocarbons, hydrogen fluoride, hydrogen chloride and the like, and mixtures thereof.

SUMMARY OF THE INVENTION

The present invention satisfies this need by providing a seal comprising cured, coherent, homogeneous elastomer blend comprising (a) chlorotrifluoroethylene/vinylidene fluoride (CTFE/VF$_2$) elastomer, (b) chlorine-free fluoroelastomer, and (c) a minor proportion with respect to the combined weight of (a) and (b) of hydrocarbon polymer.

Surprisingly, the hydrocarbon polymer, although present in a minor amount; e.g., 1 to 20 wt %, based on the weight of components (a) plus (b) in the blend, and although incompatible with the fluoroelastomers, nevertheless imparts a significant reduction in fluorochemical permeability of the seal.

The present invention also provides the curable, coherent homogeneous composition blend useful for fabrication into the seal and curing. The composition is prepared by compounding components (a), (b), and (c) together with curing agent at elevated temperature; e.g., at least 60° C., but below the curing temperature for the blend.

Surprisingly, the hydrocarbon polymer disappears into the resultant composition; i.e., it is not visible as a separate phase in the elastomer matrix under 165× magnification, whereby the composition is homogeneous in character. In addition, neither cracks nor voids, which would be expected from the presence of component (c) in the incompatible matrix of components (a) and (b), are visible under this magnification, giving the composition its coherent character.

The seals of this invention are effective in handling the more aggressive fluorochemicals used for refrigeration such as 2,2-dichloro- 1,1,1-trifluoro-ethane (HFC-123 ) and substitutes for CFCs together with other fluorocarbons, chlorocarbons, HF, HCl or mixtures thereof.

DETAILED DESCRIPTION OF THE INVENTION

The CTFE/VF$_2$ polymer used to make composition of the present invention, which, in turn, is used to make the seals of the present invention generally contains about 25–50 mol% chlorotrifluoroethylene, the balance being vinylidene fluoride, and is curable to an elastomer. This product is commercially available through 3M as Kel-F® elastomer. The term "elastomer" as used herein means a polymer which exhibits little plastic flow and quick or nearly complete recovery from an extending force. The extending force can stretch the polymer to 100% without breaking. After such stretch and being held for 5 minutes and then released, it will retract to within 10% of its original length within 5 minutes after release.

Chlorine-free fiuoroelastomer (component b) includes both perfiuoroelastomer and hydrogen-containing fiuoroelastomer. Examples of chlorine-free fiuoroelastomer include tetrafluoroethylene/perfluoro(alkyl vinyl) ether (TFE/PAVE) polymer and vinylidene fluoride/hexafluoropropylene (VF$_2$/HFP) polymer, curable to elastomer.

With respect to the TFE/PAVE polymer, this polymer contains sufficient PAVE to provide elastomer properties, when cured. PAVE includes perfluoro(alkoxy alkyl vinyl)ether (PAAVE). The alkyl group of the PAVE preferably contains 1 to 8 carbon atoms. Preferably the PAVE is perfluoro(methyl vinyl)ether (PMVE) or PAAVE. TFE/PMVE elastomer is available from DuPont and TFE/PAAVE polymer is available from Daikin as Dai-el Perfluor GA-55® fluoroelastomer. The amount of PAVE will generally be about 25 to about 40 mol % PAVE and complementally to total 100 mol % about 75 to about 60 mol% TFE. When less than about 25% of the PAVE is added, the copolymer generally does not exhibit sufficiently elastomeric properties; addition of more than about 40% of the PAVE is difficult.

A wide variety of hydrogen-containing fluoroelastomers can be used in this invention. They are copolymers of at least one fluorinated monomer, but may incorporate monomers containing no fluorine. These polymers commonly, but not universally, incorporate vinylidene fluoride (VF$_2$) as a monomer. The most common fluoroelastomers are copolymers of $VF_2$ with hexafluoropropylene (HFP) and optionally tetrafluoroethylene (TFE). However, the use of other fluoromonomers and of monomers that do not contain fluorine is well known. Other monomers than can be used include hydrocarbon olefins such as ethylene (E) or propylene (P), and PAVE, as described above. A preferred PAVE is perfluoro(methyl vinyl)ether (PMVE). Fluoroelastomers incorporating such monomers include $TFE/VF_2/PMVE$, E/TFE/ PMVE, and TFE/P copolymers.

The $VF_2$/HFP polymer is a preferred member of the class of hydrogen-containing fluoroelastomers. The copolymers generally contain from 70% to 30% by weight of vinylidene fluoride units and from 30% to 70% by weight of hexafluoropropylene (HFP) units. When the fluoropolymer contains less than 30% of HFP units it tends to become non-elastic. Production of a fluoropolymer containing more than 70% HFP is difficult. This polymer is available, for example, as Viton® fluoroelastomer by DuPont.

To provide or enhance curability, fluoroelastomers may include reactive cure site moieties derived from small concentrations of cure site monomers in addition to the primary monomers described above. Such monomers can include, for example, bromine-containing fluoroolefins and fluoro(vinyl ethers), and cyano-substituted fluoro(vinyl ethers). Cure site monomers may be present in concentrations up to about 3 mol%. Alternatively or additionally, chain transfer agents that are not perfluorinated can be used in the polymerization reaction to introduce desirable fragments into the polymer for curing purposes. Such agents include iodinated compounds that result in bound iodine in the polymer, commonly at one or both ends of the molecule. When iodinated compounds are used in polymerization, the resulting concentration of iodine in the fluoroelastomer is at least 0.001 wt %, desirably at least about 0.05 wt %, and preferably at least about 0.1 wt %. The hydrogen-containing fluoroelastomer is generally amine or polyol curable.

The $CTFE/VF_2$, and chlorine-free fluoropolymers curable to fluoroelastomers, such as the TFE/PAVE and $VF_2$/HFP polymers described above are typically individually supplied with curing agents and compounding ingredients, such as triallylisocyanurate and/or organic peroxide (curing agents), compounding oil, and reinforcing agent such as carbon black, in amounts ranging from 1–5 wt % (curing agent), 1–5 wt % (compounding oil), and 5–30 wt % (carbon black) based on the total weight of the entire individual polymer composition. Each polymer is in a compoundable form; e.g., gum, so that they may be blended together. Each polymer might have different or the same curing agents and compounding ingredients as compared to the other polymer.

It is important that the compounding ingredients used in the blends of this invention should be free of any ingredient which is reactive with fluorochemical under expected conditions of use; e.g., metal oxides or carbonates such as CaO, PbO, $CaCO_3$, should not be present if these blends are to be used in contact with HF or HCl.

The hydrocarbon polymer used in the invention (component (c)) generally has sufficient flow at the usual compounding temperature of 60° C.–120° C. so as to be able to be homogenized into the matrix blend of components (a) and (b). In the case of crystalline hydrocarbon polymers, this is accomplished by relatively low molecular weight for the polymer, e.g., 1,000 to 10,000. In the case of amorphous (elastomeric) hydrocarbon polymers, this is achieved by the polymer having a glass transition temperature ($T_g$) less than 60° C. Representative hydrocarbon polymers include ethylene and propylene polymers, such as polyethylene, polypropylene, ethylene/propylene rubbers with or without a third monomer such as a nonconjugated diene (EPDM).

Proportions of components (a) and (b) can vary widely, e.g., 10 to 90 wt % of (a) and complementally to total 100 wt %, 90 to 10 wt % of (b). Both are fluoropolymers and can be readily blended together. Preferably, the proportion of the $CTFE/VF_2$ polymer will be from about 10 to 50 wt % of the total amount of (a) plus (b). For ease of compression molding, however, it is preferred that the proportion of $CTFE/VF_2$ polymer be no greater than 20 wt %. When less than 10 wt % of the $CTFE/VF_2$ polymer is present, the thermal resistance becomes less than desired. Component (b) can be either a single chlorine-free curable polymer or a mixture thereof, such as a mixture of TFE/PAVE polymers, $VF_2$/HFP polymers or a mixture of both. These weight percents refer to the fluoropolymers but also generally apply to the individual fluoropolymer compositions which contain their respective curing agents and compounding ingredients, which will be in similar proportion with respect to their associated fluoropolymer. Gums which are curable to elastomer are typically made available with curing and compounding ingredients in amounts not disclosed by the supplier and not determinable by analysis, but it is believed that the individual polymer (gum) composition will usually be at least 80 wt % polymer.

The proportion of hydrocarbon polymer will depend on the particular hydrocarbon polymer used and its compoundability at particular concentrations, in terms of achieving coherence and homogeneity of the ultimate blend. This polymer is used in an amount which is a minor amount relative to (a) plus (b) and which is effective to decrease the permeability of the seal to the fluorochemical. Typically this can be achieved by 1 to 15 wt % of the polymer based on the weight of components (a) plus (b), and preferably from about 2 to 10 wt % of the hydrocarbon polymer.

In formulating the curable, coherent, homogeneous compositions of this invention, it is important that the various components be thoroughly mixed. Methods of adding and blending curing agents and compounding ingredients into a polymer are well known in the art. It is usually done on a roll mill in which the first polymer component is placed on a heated pair of rolls to form a band around the roll drum and the other components are added stepwise. Blending is done by cutting the polymer band with a knife and adding the cut portion back to the roll in a different location, a process called crosscutting. Examination of cross sections of compositions of the present invention after compounding and after fabrication into articles such as O-rings and curing, under 165× magnification surprisingly have shown both the compositions and cured blends to be coherent and homogenous. Other mixing and blending apparatus suitable for carrying out this process include a Banbury mixer, a mixing extruder, or other devices can be used. After compounding to form the composition, the composition can be placed in a mold under pressure to form the desired shape of the seal, wherein the composition is then heated to cure the composition to obtain the seal as a result thereof. Often this curing is carried out in two steps; first, initial curing within the mold followed by postcure outside of the mold.

The ability of the seal to withstand fluorochemical is generally based on testing of exposure to hydrogen fluoride at elevated temperature and elevated pressure, depending on the test. An HCFC, such as HCFC-123 may also be present. The tests include chemical resistance as evidenced by volume swell and weight gain of the seal. Retention of the elastomeric character of the seal can be judged by the testing for change in hardness. In the latter case, if the seal either increases or decreases in hardness, the seal can fail by virtue of the seal becoming brittle or too soft (respectively).

Testing of Existing Elastomers on Exposure to HCFC-123

As a first step in seeking a suitable seal for fluorochemical such as HCFC-123, existing elastomers were subjected to a mild exposure test, by immersion of the commercially available elastomer in HCFC-123 for seven days at 54° C. Even in this mild exposure test, none of these elastomers were suitable.

In greater detail, each elastomer (compounded and cured) in sheet form was cut into strips 3×0.6×0.3 cm and each strip was immersed in a horizontally disposed closed 12 ml vial (1.6 cm I.D.×7.6 cm long) containing 5 ml of the HCFC-123 under the time and temperature conditions mentioned above. Volume swell of each elastomer strip was determined at the end of the seven days' exposure while still immersed in the HCFC-123, by measuring the increase in length of the strip and cubing the resultant ratio of increased length to original length, assuming the swell was uniform in each dimension. The weight gain was measured one hour after the strip was removed from the HCFC-123. The test results are shown in the following Table A.

TABLE A

| Elastomer | % Vol. Swell | % Wt. Gain |
|---|---|---|
| Nordel ® ethylene-propylene | −12% | −13% |
| Viton ® A fluoroelastomer | 63% | 44% |
| Adiprene ® L polyurethane | 319% | 164% |
| Thiokol ® FA polysulfide | 7% | 4% |
| Silicone rubber | 142% | 35% |
| Buna S styrene butadiene | 21% | 24% |
| Polyisoprene natural rubber | 143% | 28% |
| Hypalon ® chlorosulf. poly-ethylene | 45% | 11% |
| Neoprene ® W polychloroprene | 37% | 27% |
| Isobutylene isoprene butyl rubber | 39% | 15% |
| Buna N acrylonitrile butadiene | 61% | 59% |

All the above elastomers were considered unsatisfactory under this mild exposure to HCFC-123 because of excessive volume swell and weight gain. The only sample with a reasonably low swell and weight gain under these moderate temperature conditions was the polysulfide, but it was ruled out because of its known poor resistance to acids and poor mechanical properties including compression set.

A second set of immersion tests were carried out on 19 various elastomers in strip form as above in boiling HCFC-123 (30° C.) for a period of only 8 hours. Results were as follows:

TABLE B

| Elastomer | % Vol. Swell |
|---|---|
| Styrene-butadiene rubber | 16% |
| Butyl rubber | 33% |
| Nordel ® hydrocarbon rubber | −5% |
| Adiprene ® urethane rubber | 238% |
| NBR nitrile | 64% |
| Hypalon ® synthetic rubber | 44% |
| Neoprene polychloroprene | 16% |
| Hydrin ® polyepichlorhydrin | 33% |
| Alcryn ® hydrocarbon TPE | 64% |
| Hytrel ® polyester elastomer | 69% |
| Silicone rubber | 110% |
| Thiokol ® FA polysulfide | 16% |
| Thiokol ® ST polysulfide | 77% |
| Vamac ® ethylene acrylic elastomer | 186% |
| Aflas ® TFE/propylene copolymer | 120% |
| Viton ® A fluoroelastomer | 60% |

TABLE B-continued

| Elastomer | % Vol. Swell |
|---|---|
| Viton ® B fluoroelastomer | 82% |
| Viton ® GF fluoroelastomer | 77% |
| Kalrez ® fluoroelastomer | 56% |

The degree of swell (or shrinkage) in only 8 hours at a relatively low temperature would rule out all these materials for extended use.

A series of tests were run on O-rings of different elastomers exposed to a gaseous mixture of HCFC-123 and AHF (anhydrous HF) at 120° C. for 168 hours to simulate the exposure encountered in the use of O-rings as seals in chemical process equipment. Further details of this exposure test are given in the general procedure in the Examples. These conditions of exposure (exposure to gaseous chemical mixture for 120° C. for 168 hours) in accordance with the general procedure is the Chemical Process Simulation Exposure Test. Seals of the present invention preferably have volume swell of less than 15%, weight gain of less than 15% and change in hardness of less than 15% when exposed to this test, and more preferably less than 10% for each of these parameters. Even more preferably, the % volume swell and weight gain is less than 5% for each parameter. CTFE/VF$_2$ elastomer Kel-F®3700 was included in this test despite its known limitations on physical properties. TFE/PAAVE polymer (Dai-el Perfluoro GA-55®, (hereinafter called GA-55) was also included in this test, along with TFE/PMVE polymer (Kalrez® fluoroelastomer 4079 O-rings), with the results shown in Table C.

TABLE C

| Fluoro-elastomer | % Vol. Swell | % Wt. Gain | Hardness (DA) Start | End | Change |
|---|---|---|---|---|---|
| Kel F ® 3700 | 24.4 | 12.5 | 74 | 68 | −6 |
| GA-55 | 15.1 | 2.0 | 81 | 77 | −4 |
| Kalrez ® 4079 | 39.1 | 28.5 | 78 | 70 | −8 |

The GA-55 had a low weight gain, and was relatively good in volume swell and compression set, but not to the desired level. The sample was observed to have some surface blisters, but it was elastic and did not crack when stretched. Two more samples of the GA-55 were made and tested, and all showed the same surface defects. The Kel F® proved to be superior in compression set to the other commercial fluoroelastomers tested, but poor in volume swell. Attempts were made to improve the performance of these three products by reformulating their compounding mix, but little or no improvement was shown.

Thus, fluoroelastomers existing prior to the present invention did not provide seals with adequate sealing capacity and chemical resistance and physical integrity to be economically useful for containing such corrosive materials as HCFCs and HF. Normally, materials that will withstand these materials will also withstand chlorocarbons, CFC's and HCl and hydrocarbons as well and be useful as a seal therefor. Curable blends of the present invention are also useful for other applications such as hose.

EXAMPLES

The following examples are illustrative of the invention, wherein parts are by weight unless otherwise indicated.

General Procedure

The compounding ingredients that were used were carbon black to impart compression resistance to the composite, halocarbon oil to impart dynamic properties, swell control and temperature resistance, Diak® No. 7 (triallylisocyanurate curing agent) as a secondary curing agent, with Luperco® 101XL (organic peroxide curing agent) as the primary peroxide curing agent.

The CTFE/VF$_2$ polymer was banded on a hot mill at 77° C. to 88° C. roll temperature for approximately 4 minutes. The carbon black was then blended into the polymer until incorporated, taking about 7 minutes. The hydrocarbon polymer (polyethylene) was then added, and the mix blended and crosscut until uniform, taking about 3 minutes. Then the Luperco® was added until fully dispersed in the batch, taking another 3 minutes. The halocarbon oil was then added slowly until fully incorporated in the batch, taking about 4 minutes. Finally the Diak® was added, and both sides of the batch were crosscut about seven times to insure uniformity. Then the batch was rolled 5 to 6 times. The time required for Diak® addition and rolling was about 6 minutes. The rubber was then removed from the roll and allowed to cool. The batch temperature when stripped off the roll was about 99° C. to 104° C.; the mill roll temperature was estimated at 113° C. to 118° C. The total mixing time of this first mix (Compound A) was about 25 to 30 minutes.

The second mix was designated as "Compound B," and contained 100 pts of tetrafluoroethylene-perfluoro(methylvinyl) ether copolymer, GA-55, a precompounded gum containing carbon black, oil, and curing agent.

The final blend was composed of various weighed proportions of Compound A and Compound B as will be described in these Examples. Compound B was first preblended on the rolls for about 5 minutes to break down the compound and to build the desired mill-roll temperature to about 77° C. to 88° C. Then Compound A was added slowly to Compound B on the mill, adding about one-third of the batch each time and crosscutting the blend 2 to 3 times after each addition. After the addition of Compound A was complete, the blend was mixed thoroughly on the mill and crosscut from time to time until the blend was smooth and well blended in appearance. When an adequate mix was accomplished, the blend was rolled on the mill rolls for at least 7 times, and then stripped off the rolls and allowed to cool to room temperature. It was found desirable to let the blend "relax" for at least 12 hours prior to molding to improve the appearance and properties of the finished products.

After rheological testing of the blend to ensure it met desired initial properties, i.e., further compounding was not necessary, it was placed back on the mill for preheating about 4 to 5 minutes, and then stripped off the roll and cut into long strips for feeding to the extruder for preforming into rope. The extruder temperature was about 52° C., with the die temperature about 82° C. A sample of the extruded compound was then examined in the laboratory to make sure it met all required standards. Then O-rings were molded using a 5-minute cure time and 182° C. mold temperature. The O-rings were then oven cured for 16 hours at 150° C. Oven curing resulted in optimum physical properties, a tighter cure and for the liberation of hydrogen fluoride gas and peroxide radicals from the product.

After this preparation of O-rings, the following tests were run: Physical properties were measured using Monsanto Tensometer T.10 to confirm that the tensile strength, elongation and modulus were comparable to that which is desired for O-rings, to qualify the O-rings for the more vigorous chemical exposure tests. The Shore "A" hardness was measured using ASTM Method D-2240. Cross sections of the O-rings were cut and viewed under 165× magnification to reveal homogeneity and absence of voids or cracks in the blends making up the O-rings.

Chemical resistance was determined as follows: Two samples of each composition of size 214 O-ring were tested by exposure to HCFC-123 for 70 hours at 150° C. as described below.

After the initial weight was taken on the latter two O-rings in both air and water, the five specimens were suspended on a hang wire in a tightly closed bomb. One-sixth of the bomb volume was filled with HCFC-123, making sure that the O-rings were not immersed, and the bomb was placed in the oven at 150° C. Since the HCFC-123 will be converted to gas when the bomb is heated to the oven temperature, this procedure ensured that the O-rings were exposed only to the gas phase, not the liquid phase. After the 70-hour exposure test, the bomb was removed from the oven and allowed to cool for one hour at room temperature. The previously weighed samples were then reweighed, taking special care to be fast and accurate since the HCFC-123 will volatilize from the O-ring in a short period of time. The volume change and weight change were measured using ASTM Method D-471.

Example 1

The following blends were made and fabricated into O-rings following substantially the general procedure as described above.

| Ingredient | Composition - Wt. % | | | | | |
| --- | --- | --- | --- | --- | --- | --- |
| | 1 | 2 | 3 | 4 | 5 | 6 |
| TFE/PAVE GA-55 | 75.00 | 75.00 | 75.00 | 75.00 | 50.00 | 25.00 |
| CTFE/VF2 (Kel F ® 3700) | 15.92 | 14.97 | 14.13 | 13.37 | 27.03 | 42.86 |
| EPDM (Vistalon ® 404) | — | — | — | — | 6.76 | 4.76 |
| Polyethylene (AC-Poly 617A) | 1.59 | 2.99 | 4.24 | 5.35 | — | — |
| N-990 Carbon Black | 6.37 | 5.99 | 5.65 | 5.34 | 13.51 | 23.81 |
| Halocarbon Oil | 0.48 | 0.45 | 0.42 | 0.40 | 1.01 | 1.43 |
| Diak ® #7 | 0.32 | 0.30 | 0.28 | 0.27 | 0.68 | 0.95 |
| Luperco ® 101XL | 0.32 | 0.30 | 0.28 | 0.27 | 1.01 | 1.19 |

Test results for these compositions are given in succeeding Examples.

Example 2

Compositions 1 and 2 were fabricated into O-rings following substantially the same general procedure as described in the general procedure, and they were then exposed to a gaseous mixture of chlorodifluoroethane (HCFC-22) refrigerant and anhydrous hydrofluoric acid (AHF) at 50° C. for a period of 198 hours using the general procedure and giving the results shown in the following Table:

| Composition | % Vol. Swell | % Wt. Gain | Hardness (DA) | | |
|---|---|---|---|---|---|
| | | | Start | End | Change |
| 1 | 4.3 | 2.9 | 83 | 85 | 2 |
| 2 | 3.7 | 2.6 | 89 | 86 | -3 |

The blends showed superior performance.

Example 3

The procedure of Example 2 was followed except for the following change: composition 1 was exposed to a gaseous mixture of 2,2-dichloro-1,1,1-trifluoroethane (HCFC-123) and anhydrous hydrofluoric acid (AHF) at 120° C. for a period of 198 hours.

O-rings of Composition 1 exhibited a volume swell of only 13.5%, weight gain of only 12.2%, and the initial hardness of 79 increased by a small amount to 82, a change of 3 units.

Example 4

The procedure described in Example 2 was substantially repeated except for the following change: Elastomer O-rings were exposed to gaseous HCFC-123 cycled at room temperature to 30° C. (boiling) temperature for 865 hours.

| Composition | % Vol. Swell | % Wt. Gain | Hardness (DA) | | |
|---|---|---|---|---|---|
| | | | Start | End | Change |
| 1 | 1.5 | 1.1 | 87 | 85 | -2 |
| 2 | 0.2 | 0.5 | 89 | 85 | -4 |
| 3 | 0.7 | 0.9 | 88 | 84 | -4 |
| 4 | 2.1 | 1.6 | 88 | 85 | -3 |
| 5 | 1.2 | 0.7 | 84 | 85 | 1 |
| 6 | 2.4 | 1.7 | 84 | 83 | -1 |

The O-rings of all of these cured compositions exhibited low volume swell, low weight gain and small changes in hardness.

Example 5

The procedure of Example 2 was substantially followed except for the following change: Elastomer O-rings were exposed to (immersed in) liquid anhydrous HF at 100° C. temperature for 170 hours.

| Composition | % Vol. Swell | % Wt. Gain | Hardness (DA) | | |
|---|---|---|---|---|---|
| | | | Start | End | Change |
| 1 | 2.5 | 3.0 | 85 | 86 | 1 |
| 2 | 5.9 | 4.0 | 85 | 87 | 2 |

Again, the blends showed superior performance.

Example 6

The procedure of Example 2 was substantially repeated except for the following change: Elastomer O-rings were exposed to gaseous hydrochloric acid (HCl) at 120° C. temperature for 205 hours.

| Composition | % Vol. Swell | % Wt. Gain | Hardness (DA) | | |
|---|---|---|---|---|---|
| | | | Start | End | Change |
| 1 | 1.5 | 1.5 | 90 | 87 | -3 |
| 2 | 2.5 | 1.5 | 87 | 85 | -2 |
| 3 | 1.8 | 1.5 | 83 | 85 | 2 |
| 4 | 2.0 | 1.5 | 85 | 86 | 1 |
| 5 | 2.4 | 1.7 | 84 | 84 | 0 |
| 6 | 2.5 | 1.7 | 87 | 84 | -3 |

In this test, the blends gave satisfactory performance.

Example 7

The procedure of Example 2 was followed except for the following change: Elastomer O-rings were exposed to gaseous perchloroethylene (PCE) at 122° C. (boiling) temperature for 840 hours.

| Composition | % Vol. Swell | % Wt. Gain | Hardness (DA) | | |
|---|---|---|---|---|---|
| | | | Start | End | Change |
| 1 | 5.2 | 4.2 | 85 | 82 | -3 |
| 2 | 6.1 | 4.9 | 88 | 84 | -4 |

In this test, the blends gave satisfactory performance.

Example 8

The following two elastomer blends were fabricated into O-rings as described in the general procedure. Composition 7 was modified from Composition 1 by substituting TFE/PMVE compounded gum which is curable to Kalrez® fluoroelastomer 2035 O-rings for GA-55, and Composition 8 was modified from previous Composition 5 by substituting Viton®B fluoroelastomer for GA-55.

| | Blend Composition (% by weight) | |
|---|---|---|
| | Composition | |
| Ingredient | 7 | 8 |
| TFE/PMVE | 75.00 | — |
| Viton ® B | — | 50.00 |
| Kel F ® 3700 | 15.92 | 27.03 |
| Vistalon ® 404 EPDM | — | 6.76 |
| AC Poly 617A | 1.59 | — |
| N-990 Black | 6.37 | 13.51 |
| Halocarbon Oil | 0.48 | 1.01 |
| Diak ® #7 | 0.32 | 0.68 |
| Luperco ® 101XL | 0.32 | 1.01 |

These two compounds were then exposed to gaseous HCFC-123 at 35° C. boiling temperature at a slightly superatmospheric pressure for a period of hours, otherwise following the procedure of Example 2, giving the following results:

| Composition | % Vol. Swell | % Wt. Gain | Hardness (DA) Start | End | Change |
|---|---|---|---|---|---|
| 7 | 8.3 | 5.5 | 98 | 92 | −6 |
| 8 | 15.4 | 14.1 | 83 | 71 | −12 |

Performance of these modified blends was also satisfactory for many applications.

What is claimed is:

1. Seal of cured coherent, homogeneous elastomer blend comprising (a) CTFE/VF$_2$ elastomer, (b) chlorine-free fluoroelastomer, and (c) a minor proportion with respect to the combined weight of (a) and (b) of hydrocarbon polymer, said hydrocarbon polymer being present in the amount of 1 to 20 wt % based on the combined weight of (a) and (b) and said blend having a volume swell of less than 15%, weight gain of less than 15%, and change of hardness of less than 15, when subjected to the Chemical Process Stimulation Exposure Test.

2. Seal of claim 1 wherein said fluoroelastomer is perfluoroelastomer.

3. Seal of claim 1 wherein said elastomer is VF$_2$/HFP elastomer.

4. Seal of claim 1 wherein said elastomer is TFE elastomer.

5. Seal of claim 4 wherein said elastomer is TFE/PAVE elastomer.

6. Seal of claim 5 wherein said PAVE is perfluoro(alkoxy alkyl vinyl) ether or PMVE.

7. Seal of claim 1 wherein the weight proportion of (a) and (b) is 10 to 90 wt % of (a) and complementally to total 100 wt %, 90 to 10 wt % of (b).

8. The seal of claim 1 wherein said hydrocarbon polymer is ethylene or propylene polymer.

9. Curable, coherent, homogeneous blend comprising (a) CTFE/VF$_2$ polymer curable to elastomer, (b) chlorine-free fluoropolymer curable to elastomer, and (c) a minor proportion of hydrocarbon polymer, said hydrocarbon polymer being present in the amount of 1 to 20 wt % based on the combined weight of (a) and (b) and said blend when cured having a volume swell of less than 15%, weight gain of less than 15%, and change of hardness of less than 15 when subjected to the Chemical Process Stimulation Exposure Test was inserted in each claim.

10. Process comprising compounding (a) CTFE/VF$_2$ polymer curable to elastomer, (b) chlorine-free fluoropolymer curable to elastomer, and (c) hydrocarbon polymer to form a coherent, homogeneous blend thereof, said hydrocarbon polymer being present in the amount of 1 to 20 wt % based on the combined weight of (a) and (b) and said blend when cured having a volume swell of less than 15%, weight gain of less than 15%, and change of hardness of less than 15, when subjected to the Chemical Process Stimulation Exposure Test was inserted in each claim.

11. Process of claim 10 and additionally forming said blend into an article and curing said article of said blend.

12. Process of claim 11 wherein said article is a seal or hose.

13. The curable blend of claim 9 containing curing agent.

14. The curable blend of claim 9 free of compounding ingredients which react with fluorochemical under the conditions of use of said blend as a seal.

15. The curable blend of claim 9 wherein said hydrocarbon polymer is ethylene or propylene polymer.

16. The curable blend of claim 15 wherein said chlorine-free fluoropolymer is VF$_2$/HFP elastomer or TFE elastomer.

17. The curable blend of claim 9 wherein the weight proportion of (a) and (b) is 10 to 90 wt % of (a) and complementally to total 100 wt %, 90 to 10 wt % of (b).

18. Process of claim 10 wherein the weight proportion of (a) and (b) is 10 to 90 wt % of (a) and complementally to total 100 wt %, 90 to 10 wt % of (b).

19. The seal of claim 1 wherein the volume swell, weight gain and change in hardness are all less than 10%.

* * * * *

UNITED STATES PATENT AND TRADEMARK OFFICE
CERTIFICATE OF CORRECTION

PATENT NO. : 5,459,202

DATED : October 17, 1995

INVENTOR(S) : Felix et al

It is certified that error appears in the above-identified patent and that said Letters Patent is hereby corrected as shown below:

Column 12, lines 7 and 17:

Claim 9, last line, delete "was inserted in each claim"

Claim 10, last line, delete "was inserted in each claim"

Signed and Sealed this

Twenty-seventh Day of February, 1996

Attest:

BRUCE LEHMAN

*Attesting Officer*     Commissioner of Patents and Trademarks

UNITED STATES PATENT AND TRADEMARK OFFICE
CERTIFICATE OF CORRECTION

PATENT NO.  : 5,459,202

DATED       : October 17, 1995

INVENTOR(S) : Felix et al

It is certified that error appears in the above-identified patent and that said Letters Patent is hereby corrected as shown below:

On the title page, item [19] should read --Felix et al.--.
item [75] the first name of the inventor should read
--Vinci M. Felix--.

Signed and Sealed this

Eighth Day of October, 1996

*Attest:*

BRUCE LEHMAN

*Attesting Officer*     *Commissioner of Patents and Trademarks*